H. E. HELMS.
CHUCK.
APPLICATION FILED JAN. 27, 1912.

1,075,353.

Patented Oct. 14, 1913.

2 SHEETS—SHEET 1.

Witnesses:
S. E. Mann
J. L. Belknap

Inventor;
Harry E. Helms
By Offield, Towle, Graves & Offield
Attys.

H. E. HELMS.
CHUCK.
APPLICATION FILED JAN. 27, 1912.
1,075,353.
Patented Oct. 14, 1913.
2 SHEETS—SHEET 2.
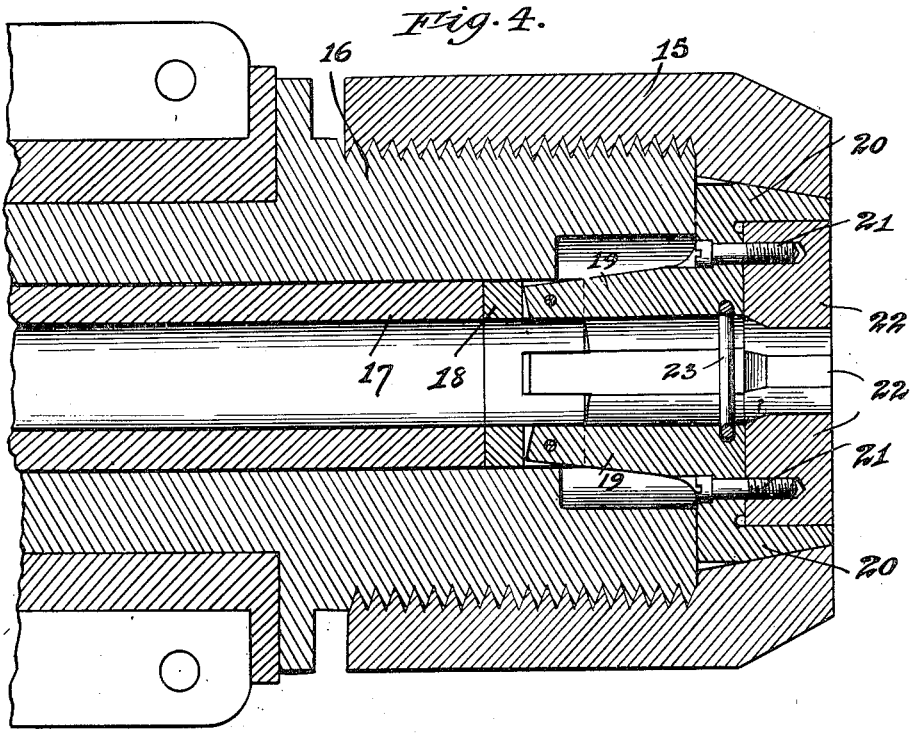
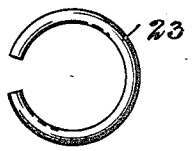
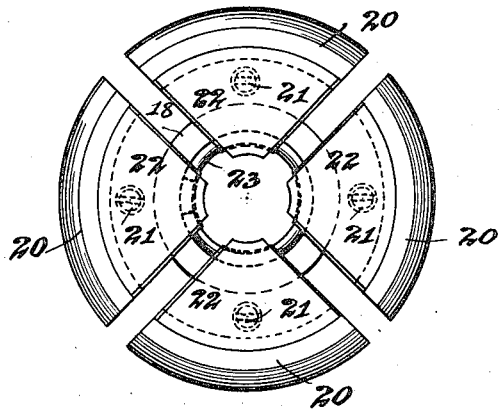
Witnesses,
Inventor,
Harry E. Helms.
By Offield, Towle, Graves + Offield
Attys

UNITED STATES PATENT OFFICE.

HARRY E. HELMS, OF KENOSHA, WISCONSIN.

CHUCK.

1,075,353.

Specification of Letters Patent.

Patented Oct. 14, 1913.

Application filed January 27, 1912. Serial No. 673,813.

*To all whom it may concern:*

Be it known that I, HARRY E. HELMS, a citizen of the United States, residing in the city of Kenosha, county of Kenosha, and State of Wisconsin, have invented certain new and useful Improvements in Chucks, of which the following is a specification.

This invention relates to improvements in chucks, and refers more particularly to an axial thrust chuck used with metal working lathes.

Among the salient objects of this invention are to produce a construction in which the gripping members and clamping jaws of the chuck are independently pivoted to the head of the latter, to permit the jaws to be clamped over the stock under maximum pressure, while at the same time reducing the danger of breakage to a minimum; to provide a construction in which the pivoted clamping jaws may be easily assembled in position, or independently replaced when necessary; to provide in a construction of the above character resilient means for automatically forcing the jaws apart to release the stock when the axial thrust upon the chuck is discontinued; to provide a construction which can be readily adapted for turning tool stock or small rods of various diameters; to provide a construction adapted for use with standard lathe machines, and which is characterized by its simplicity in construction and in operation; in general, to provide an improved construction of the character referred to.

Figure 1:
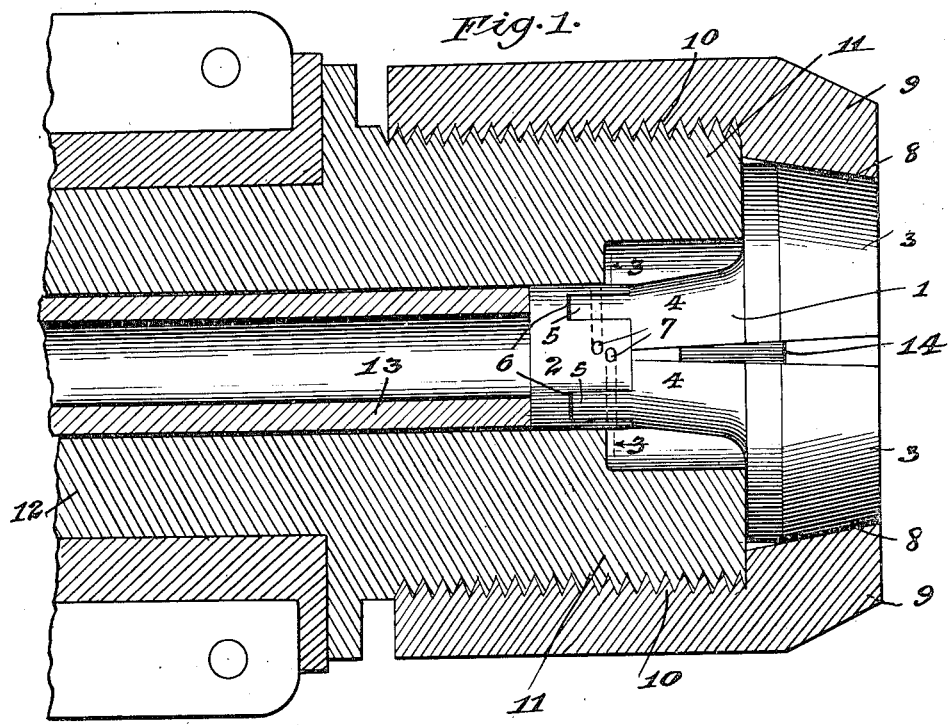
Figure 3:
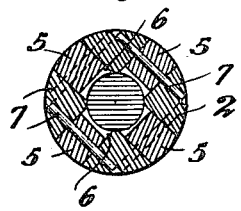
Figure 2:
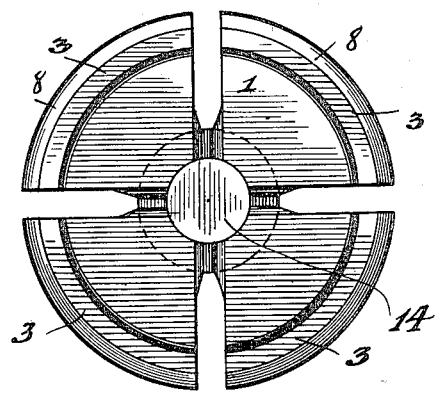

In the drawings—Figure 1 is a horizontal sectional view of my improved chuck, showing the jaws in open position; Fig. 2 is a front elevation of the same, but with the hood or collet removed; Fig. 3 is a sectional view of the chuck proper, taken on lines 3—3 of Fig. 1 and looking in the direction of the arrows; Fig. 4 is a view similar to Fig. 1, but showing a slightly modified construction; Fig. 5 is an end elevation of the construction shown in Fig. 4, but with the hood removed; Fig. 6 is a detail of the split ring which forces the jaws of the chuck apart.

Referring to the drawings, 1 designates as a whole the chuck, comprising a cylindrical body or a head 2, to which is pivoted a plurality of segmental clamping jaws 3. The shanks 4 of the clamping jaws are provided with axial lugs 5 which extend into sockets 6 formed in the head 2 and are pivoted thereto by pins 7. For convenience of connection pins 7 are preferably staggered, as shown in Fig. 1. The heads of the segmental clamping jaws are beveled at their outer faces, as shown at 8, and engage with the inner beveled face of a clamping hood or collet 9, which is threaded as shown at 10 to the chuck holder 11. The latter is integrally connected to a sleeve 12 extending from the shaft of the lathe. The chuck is thrust axially by means of a hollow spindle 13 which engages the adjacent head of the chuck head 2, but is not necessarily attached thereto. The spindle is operated in the usual manner (not shown). When the thrust on the head of the chuck is removed, the latter will automatically spring back to its normal position. When the work is completed, it is desirable to be able to readily release the stock from the chuck without stopping the lathe. To this end, within the hollow shank of the chuck, I insert a resilient member, such as a core of rubber 14, which is so arranged as to force the clamping jaws outwardly when the end thrust on the chuck is relieved. The rubber core is merely forced into the hollow shank of the chuck and is preferably tapered, as shown in Fig. 1, no special mechanism being necessary to keep the core in place. It has been found in practice that this rubber core will effectively force the jaws outwardly to permit the tool stock to be readily removed; at the same time it does not interfere with the clamping pressure of the jaws when the latter are forced into a closed position.

In Figs. 4 to 6, I have shown a somewhat modified construction. In this modification 15 designates the collet or clamping hood, 16 the sleeve to which it is threaded, 17 the hollow spindle which engages the head 18 of the chuck. To this head 18 are pivoted the shank portions 19 of the segmental clamping jaws 20 in the manner heretofore described. This construction is adapted to hold rods or other small tool stock which is to be turned. To this end, within the outer part of the jaws 20 is secured by screws 21 supplemental jaws 22 adapted to fit the size of the rod stock to be turned. The rod stock passes through the head 18, which is cored for this purpose, and extends into the hollow spindle 17. In order to force the jaws automatically apart when the end thrust on the chuck is released, a split spring ring 23 is inserted in the forward end of the shank portion of the clamping jaws; its removal, of course, permitting the rod stock to pass through it. This split ring will automatically force the jaws into open position when the pressure on the chuck head is discontinued.

The invention is not limited to the details of construction shown, except as set forth in the appended claims.

I claim as my invention:

1. The combination with a chuck holder, of a chuck head seated in said holder, a plurality of clamping jaws, each having an enlarged segmental clamping portion and a reduced shank portion, pivotal connection between each shank portion and the chuck head, the outer faces of said segmental clamping portions being beveled, a collet surrounding the jaws and acting to force the jaws into closed position when the latter are thrust forwardly, an annular resilient member seated within said shank portions and acting radially to force the jaws apart when the end thrust on the chuck head is released, and a spindle for axially thrusting the jaws forwardly into engagement with said collet.

2. The combination with a chuck holder, of a chuck head seated in said holder, a plurality of clamping jaws, each having an enlarged segmental clamping portion and a reduced shank portion, pivotal connection between each shank portion and the chuck head, the outer faces of said segmental clamping portions being beveled, a collet surrounding the jaws and acting to force the jaws into closed position when the latter are thrust forwardly, an annular resilient member having spring action radial of its axis for forcing the jaws apart when the end thrust on the chuck head is released, and a spindle for axially thrusting the jaws forwardly into engagement with said collet.

HARRY E. HELMS.

Witnesses:
A. E. BUCKMASTER,
MADELENE DORSEY.